United States Patent [19]

Inubushi et al.

[11] Patent Number: 5,109,539
[45] Date of Patent: Apr. 28, 1992

[54] PORTABLE COMMUNICATION DEVICE

[75] Inventors: Toshiya Inubushi; Atsushi Musha, both of Hyogo, Japan

[73] Assignee: Mitsubishi Denki Kabushiki Kaisha, Tokyo, Japan

[21] Appl. No.: 430,483

[22] Filed: Nov. 1, 1989

[30] Foreign Application Priority Data

Mar. 31, 1989 [JP] Japan .................. 1-82870

[51] Int. Cl.$^5$ .............................................. H04B 1/38
[52] U.S. Cl. ...................... 455/89; 455/349; 455/350; 379/433; 343/718; 343/880
[58] Field of Search ................. 455/89, 90, 95, 97, 455/347, 349, 356, 351; 379/431, 433, 434; 343/702, 715, 720, 880, 883, 889, 901; 340/825.44

[56] References Cited

U.S. PATENT DOCUMENTS

| | | | |
|---|---|---|---|
| 3,327,310 | 6/1967 | Bethune et al. | 342/702 |
| 4,388,492 | 6/1983 | Sato | 179/1 GA |
| 4,877,818 | 7/1989 | Olsen | 455/89 |

FOREIGN PATENT DOCUMENTS

| | | | |
|---|---|---|---|
| 262915 | 4/1988 | European Pat. Off. | 379/433 |
| 2533783 | 9/1982 | France . | |
| 294351 | 12/1987 | Japan | 379/433 |
| 1212389 | 11/1970 | United Kingdom . | |
| 1526491 | 9/1978 | United Kingdom . | |
| 2201861 | 9/1988 | United Kingdom . | |

*Primary Examiner*—Reinhard J. Eisenzopf
*Assistant Examiner*—Edward Urban
*Attorney, Agent, or Firm*—Rothwell, Figg, Ernst & Kurz

[57] ABSTRACT

A portable radio device in which a radio telephone device body and a receiver unit are separately constructed and connected together by a pair of adjustable supporting rods. As a result, the distance between the radio telephone device body and the receiver unit can be adjusted according to whether the device is being used as a telephone unit or a pager unit. While being used as a telephone, the distance between a receiver and a microphone can be easily adjusted to the distance between an ear and a mouth of a user. When the device is used as a paper, it can be miniaturized so as to be conveniently carried.

18 Claims, 7 Drawing Sheets

FIG.6(PRIOR ART)
FIG.5(PRIOR ART)
FIG.4(PRIOR ART)
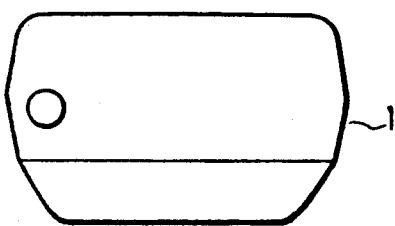
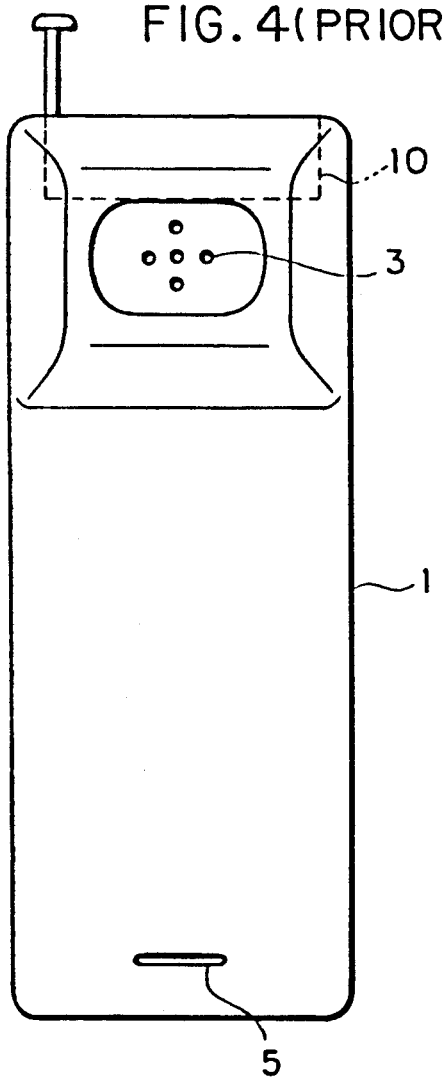
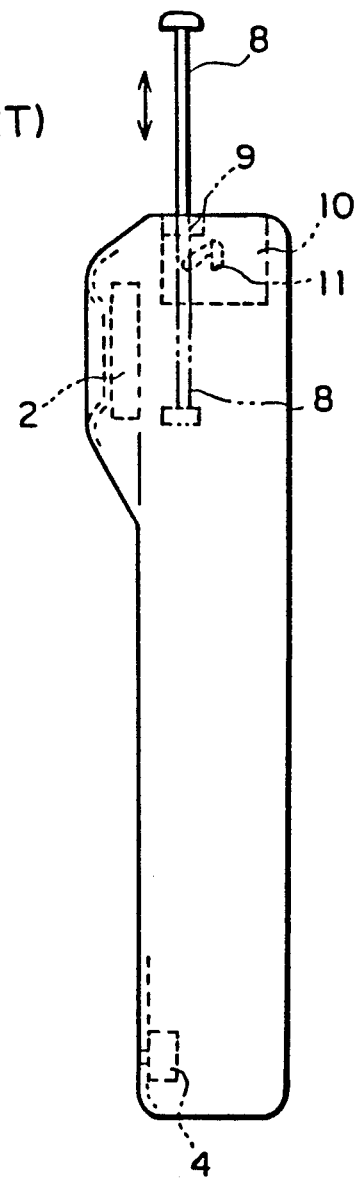

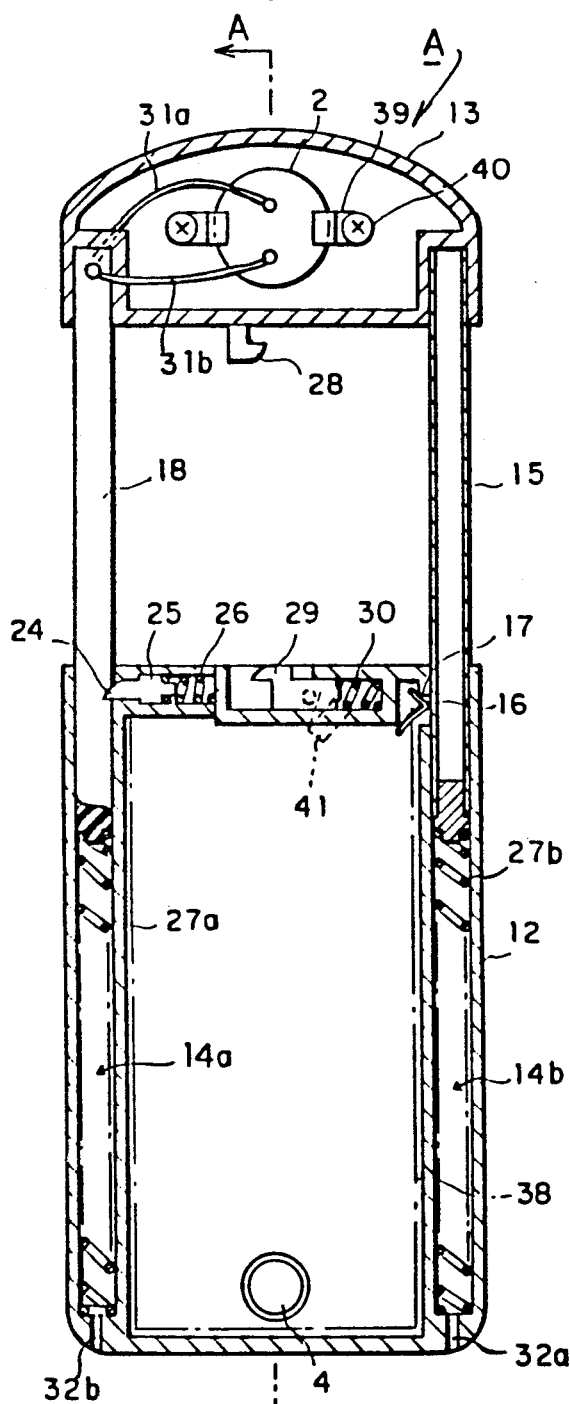
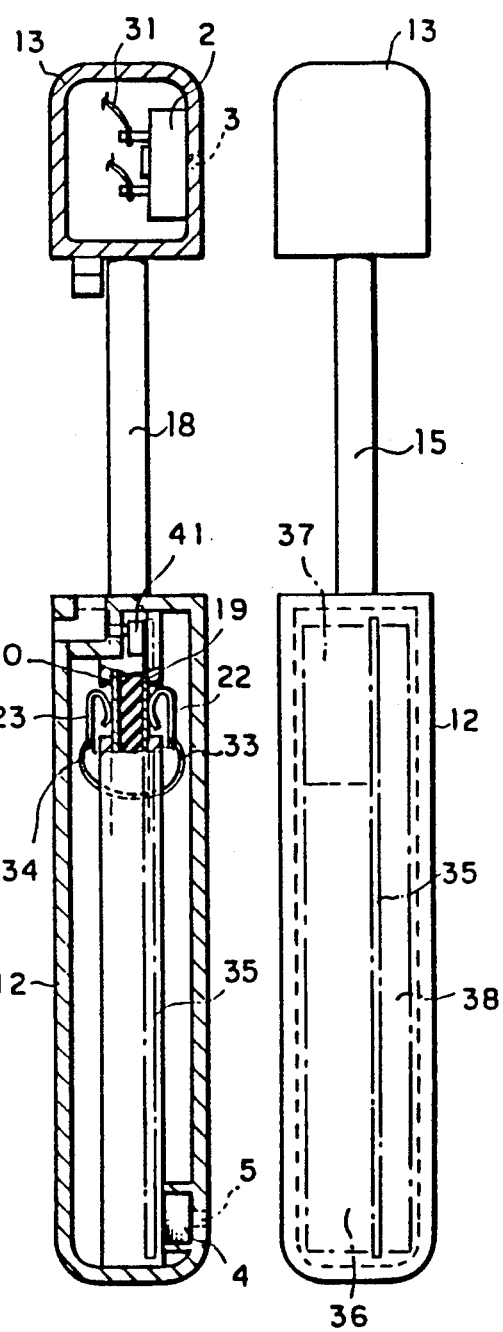
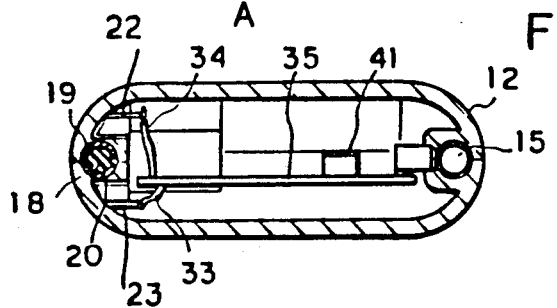

PORTABLE COMMUNICATION DEVICE

BACKGROUND OF THE INVENTION

1. Field of the Invention

This invention relates to a housing for a portable telephone.

2. Description of the Prior Art

FIG. 1 is a front view showing a conventional portable telephone, FIG. 2 is a right side view of the same, and FIG. 3 is a plan view of the same.

In FIGS. 1 to 3, reference numeral 1 denotes a housing; 2 is a receiver provided internally of a housing; 3 is a voice hole provided in the outer surface of the housing t release sound from the receiver 2 outside the housing; 4 is a microphone provided in the outer surface of the housing to transmit a sound from the outside to the microphone 4; 6 is an externally fixed antenna; and 7 is a connector for connecting and holding the antenna on the housing.

The operation will be described hereinafter. When the telephone is held, the antenna 6 remains mounted on the connector 7, but the antenna 6 may be removed to prevent it from being broken.

When the device is used as a telephone, the antenna is mounted thereon, and the telephone is positioned adjacent the user's ear and mouth to effect conversation.

FIG. 4 is a front view showing a further example of a conventional portable telephone, FIG. 5 is a right side view of the same, and FIG. 6 is a plan view of the same. Parts similar to those shown in FIGS. 1 to 3 are indicated by the same numerals, and duplicate description will be omitted. In FIG. 5, numeral 8 denotes an external antenna which is received in the housing 1. Element 9 is a member for mounting the external antenna 8 to the housing and electrically connecting it thereto. Element 10 is an internal antenna unit contained in the housing 1 and 11 is a change-over switch for switching to and from the internal antenna 10 and the external antenna 8.

The operation of the portable telephone shown in FIGS. 4 to 6 will be described hereinafter. When the telephone is held, the external antenna 8 is inserted into the housing 1 to assume a state of waiting a reception by the internal antenna 10.

When the device is used as a telephone, the external antenna 8 is drawn out of the housing 1, and the change-over switch 11 is switched from the internal antenna unit 10 to the external antenna 8 in association with the aforesaid drawing action. The portable telephone is then positioned adjacent a user's ear and mouth as with a conventional telephone to effect conversation.

The conventional portable telephone is constructed as described above. As illustrated, the distance between the receiver and the microphone is fixed. As the portable telephone is made smaller or more compact for convenience of use, the fixed distance between the receiver and microphone is reduced. This results in either the mouth or the ear being displaced from the receiver or microphone during conversation, thereby making the telephone difficult to use.

SUMMARY OF THE INVENTION

This invention overcomes the above-described problems. It is an object of this invention to provide a portable communication device in which the distance between the microphone and the receiver is adjustable.

A portable communication device according to this invention comprises a radio telephone device body housing therein a radio instrument means, and a receiver unit housing therein a receiver formed independently of the radio telephone device body. The radio telephone device body and said receiver unit are held on at least one supporting rod, and means are provided for adjusting the distance between the radio telephone device body and the receiver unit.

Other objects and features of the invention will become apparent from the following detailed description made with reference to the drawings.

BRIEF DESCRIPTION OF THE DRAWINGS

FIG. 4 is a front view of a further conventional portable radio telephone device;

FIG. 5 is a side view of the embodiment of FIG. 4;

FIG. 6 is a plan view of the embodiment of FIG. 4;

FIG. 8 is a side view of the embodiment of FIG. 7;

FIG. 9 is a longitudinal sectional rear view of the embodiment of FIG. 7;

FIG. 10 is a longitudinal sectional side view in direction A—A of the embodiment of FIG. 9;

FIG. 11 is a cross-sectional plan view of the embodiment of FIG. 7;

PREFERRED EMBODIMENTS OF THE INVENTION

Figure 3:
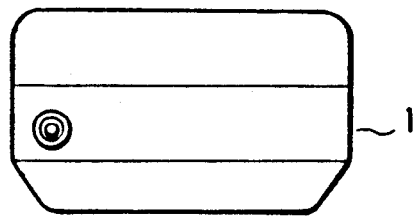
FIG. 3 is a plan view of the embodiment of FIG. 1.
Figure 1:
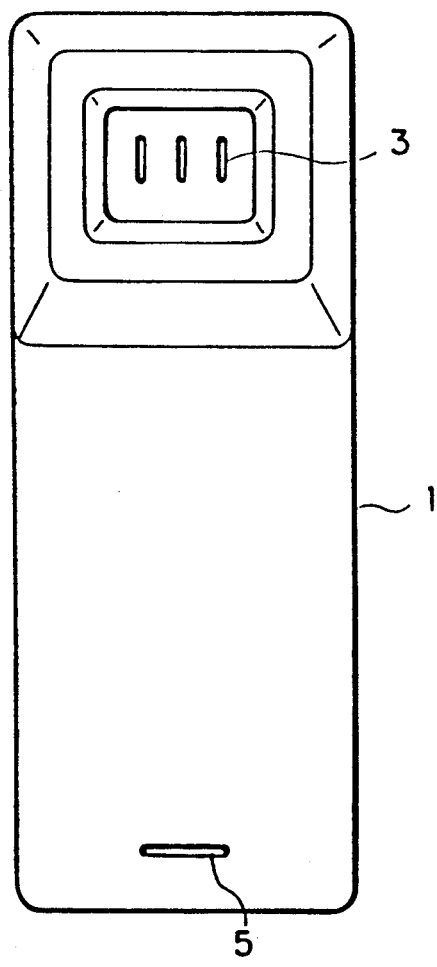
FIG. 1 is a front view of a conventional communication device.
Figure 2:
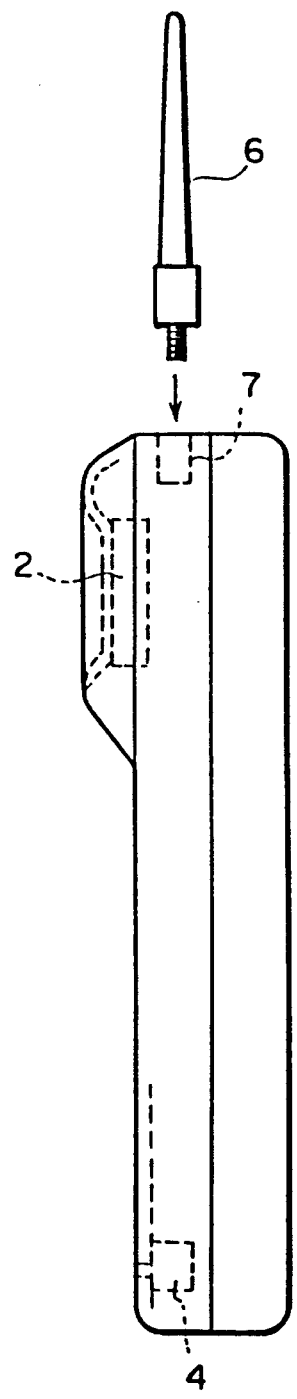
FIG. 2 is a side view of the embodiment of FIG. 1.
Figure 7:
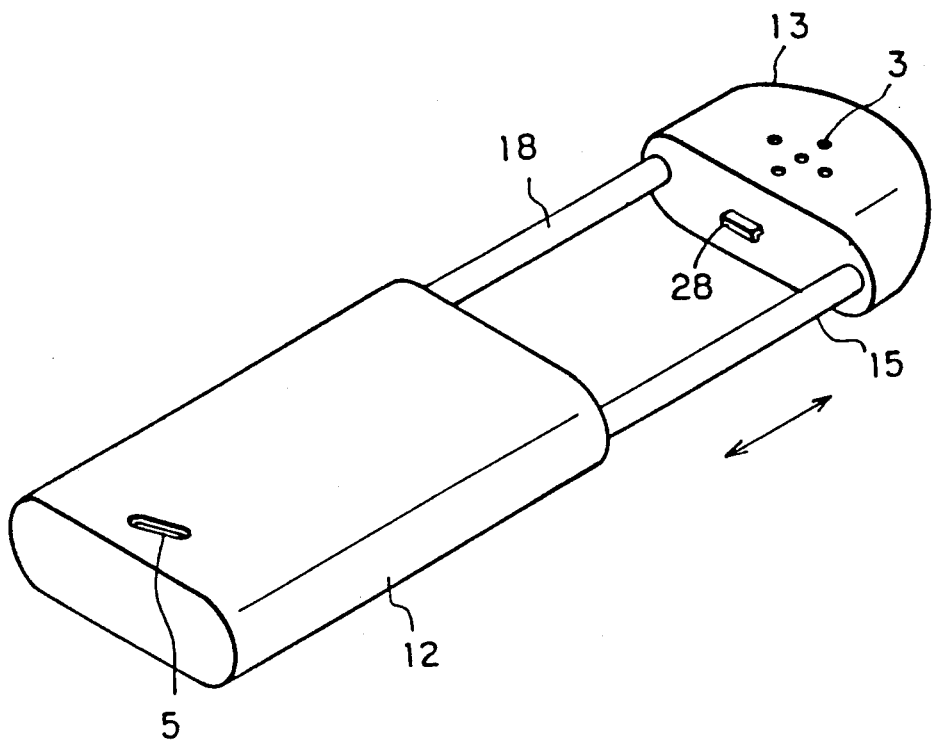
FIG. 7 is an external perspective view showing a portable communication device according to one embodiment of this invention.

Preferred embodiments of, this invention will be described with reference to the drawings. FIG. 7 is an inclined view showing a portable communication device embodying the present invention; FIG. 8 is a side view of the same; FIG. 9 is a longitudinal sectional rear view of the same; FIG. 10 is a longitudinal sectional side view in direction A—A of the same; and FIG. 11 is a cross-sectional plan view of the same.

Referring to FIGS. 7 to 11, there is illustrated a portable communication device A in which numeral 12 denotes a radio telephone device body housing therein a radio instrument means which includes radio transmitter circuitry and a microphone 4; and in which 13 is a receiver unit housing therein a receiver 2; and 14 is a housing space for supporting rods 15 and 18 formed on opposite sides of the radio telephone device body 12.

Supporting rod 15 has one end mounted on the receiver unit 13 while the other end is inserted into the housing space 14. The supporting rod is preferably formed of a metal body so as to also serve as an antenna.

In FIG. 9, numeral 16 denotes an electric connection in the form of a metal spring provided so as to contact the peripheral surface of the antenna, support rod 15, at all times. Notch 17 is formed in the radio telephone device body 12 so as to cause the metal spring 16 to contact the antenna 15. Supporting rod 18 is formed of an electric insulator having one end mounted on the receiver unit 13 while the other end is inserted into the housing space 14.

Figure 19:
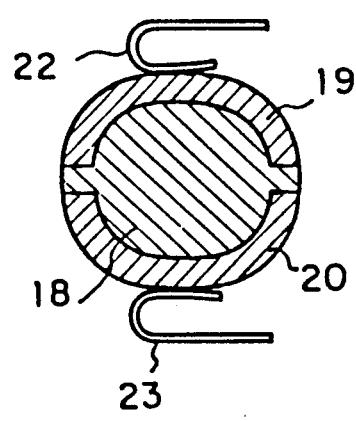
FIG. 19 is a cross-sectional view of support rod 18.

Referring now to FIGS. 10, 11 and 19, supporting rod 18 is an injection molded center post which supports and electrically insulates metal conductors 19 and 20 mounted on the outer surface and parallel to its longitudinal axis. Electrical lines 22 and 23 in the form of metal springs are mounted on the radio telephone device body so as to contact the metal conductors 19 and 20. Metal springs 22 and 23 are separated and electrically insulated by radio telephone device body 12 as shown in FIG. 11. Engaging recess 24 is provided in the lower peripheral surface of the supporting rod 18. Engaging pawl 25 engages the engaging recess 24, and 26 is a coil spring for pressing the engaging pawl 25 against the supporting rod 18. A plurality of engaging recesses can also be provided on supporting rod 18 so that the radio telephone device body and the receiver unit can be adjustably secured at a plurality of distances. Coil springs 27a and 27b are mounted in cylindrical housing spaces 14a and 14b so as to always exert an outward force on supporting rods 15 and 18. Hook 28 is provided on the receiver unit 13, and 29 is an engaging lever provided on the radio telephone device body 12 which engages and holds the hook 28. Coil spring 30 forces the engaging lever 29 in an engaging direction at all times.

In FIG. 9, numerals 31a and 31b denote signal wires which are connected to the receiver 2 and to the metal conductors 19 and 20. Air holes 32a and 32b are provided in the lower end of the housing space 14 to prevent air pressure from building up which would prevent or hinder the rods 15 and 18 from being inserted therein. FIGS. 10 and 11 show signals wires 33 and 34 connecting the metal springs 22 and 23 with a printed circuit board 35. Also, one end of the spring 16 is soldered to the printed circuit board 35.

Referring now to FIG. 8, numeral 36 denotes a high frequency circuit unit such as a telephone provided on the surface of the printed circuit board 35. High frequency circuit unit 37, such as a pager is provided on the surface of the printed circuit board 35. Control unit 38 is for housing therein a logic circuit and an audio circuit provided on the back of the printed circuit board 35.

With the above-described structure, the receiver 2 is electrically connected to the circuit 36 to 38 provided on the printed circuit board 35 through the signal wire 31→metal conductors 19, 20→metal springs 22, 23→signal wires 33, 34.

Figure 12:
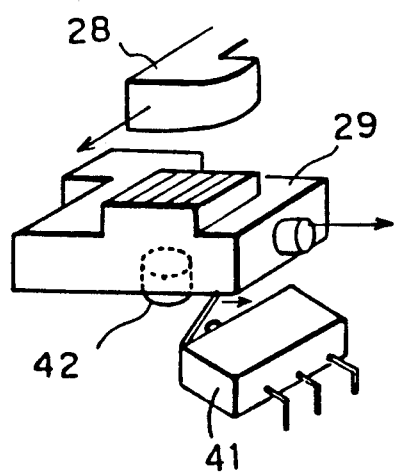
FIG. 12 is a perspective view showing the relationship between a hook, an engaging lever and a microswitch.

In FIG. 9, numeral 39 denotes a member for holding and securing the receiver 2; 40 is a screw for mounting the member 39 to the receiver unit 13; and 41 is a microswitch for electrically switching a telephone unit to and from a pager unit. The microswitch 41 is provided on the radio telephone device body 12 so that the microswitch 14 may be opened and closed by movement of the engaging lever 29. FIG. 12 is a perspective view showing the relationship between the hook 28, the engaging lever 29, contact element 42 and the microswitch 41.

Figure 14:
FIG. 14 is a side view of the embodiment of FIG. 13.
Figure 13:
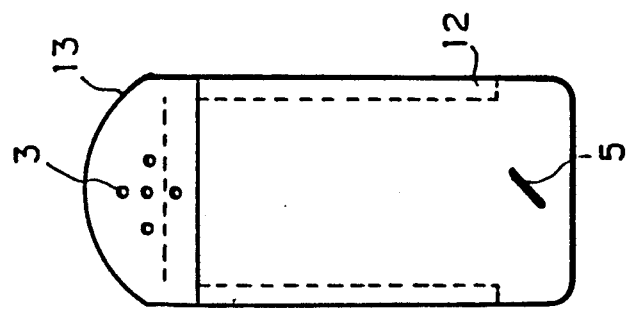
FIG. 13 is a front view showing the state in which a portable communication device according to this invention is held.

The operation of the above-described embodiment will be described hereinafter. When the device is used as a pager unit, the supporting rods 15 and 18 are moved into the housing space 14 so that, as shown in FIGS. 13 and 14, the receiver unit is moved close toward the radio telephone device body 12 to bring the hook 28 into engagement with the engaging lever 29 to maintain the access state.

In this state, the entire shape becomes compact and can be easily held. The antenna 15 is connected to the radio device circuit through the metal spring 16. The engaging lever 29 is moved backward when engaged with the hook 28 and the microswitch 41 is controlled by a convex portion 42 thereof. As a result, the radio telephone device is switched to a paging mode and serves as a receiver with the antenna 15 being housed.

Figure 16:
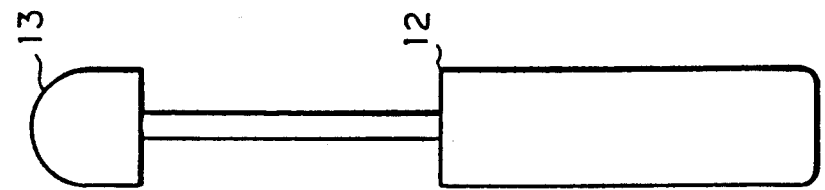
FIG. 16 is a side view of the embodiment of FIG. 15.
Figure 15:
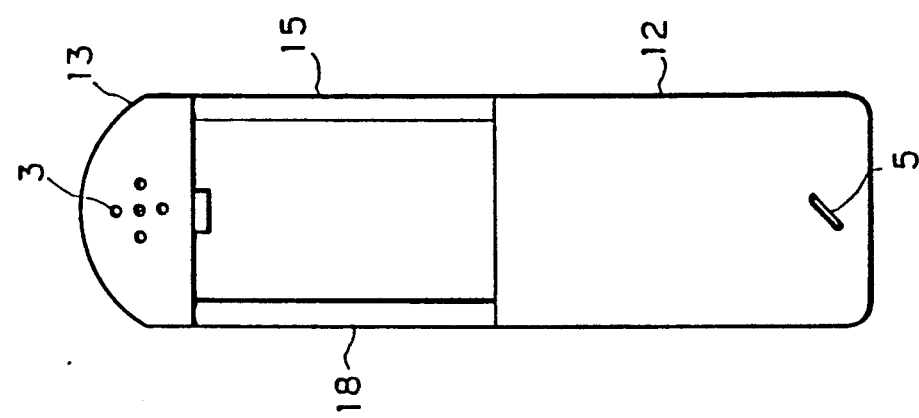
FIG. 15 is a front view showing an embodiment in which the portable communication device is held.

Next, when the device is used as a telephone, the engaging lever provided on the radio telephone device body 12 is slidably moved in a direction of releasing engagement, whereby the engaged hook 28 and lever 29 are released. The receiver unit 13 is then extended as shown in FIGS. 15 and 16 by means of the coil springs 27a and 27b which always exert an outward force on the antenna 15 and the supporting rod 18.

Then, the engaging pawl 25 being urged against the side of the supporting rod 18 is engaged with the engaging recess 24 provided in the supporting rod 18 by the coil spring 26. The receiver unit 13 becomes locked at a position away from the radio telephone device body 12.

In this state, the engaging lever 29 does not act on the microswitch 41, and the radio telephone device is switched to the telephone mode and transmits and receives signals by use of the extended antenna 15.

Then, the receiver unit 13 is extended out whereby the distance between the voice hole 3 of the receiver 2 and the voice hole 5 of the microphone 4 is maintained at a distance corresponding to that between ear and mouth of a user. This construction makes it easier and more comfortable to use as a telephone.

Further, since the supporting rod 15 is used as an antenna, a space for housing the antenna need not particularly be provided, and an internal antenna is not required to simplify the construction, thus reducing the weight.

Moisture entering the housing spaces 14a and 14b through the antenna 15 and the supporting rod 18 naturally flows out from the drain holes 32a and 32b and therefore reduces the possibility of damaging the electric circuits.

Figure 17:
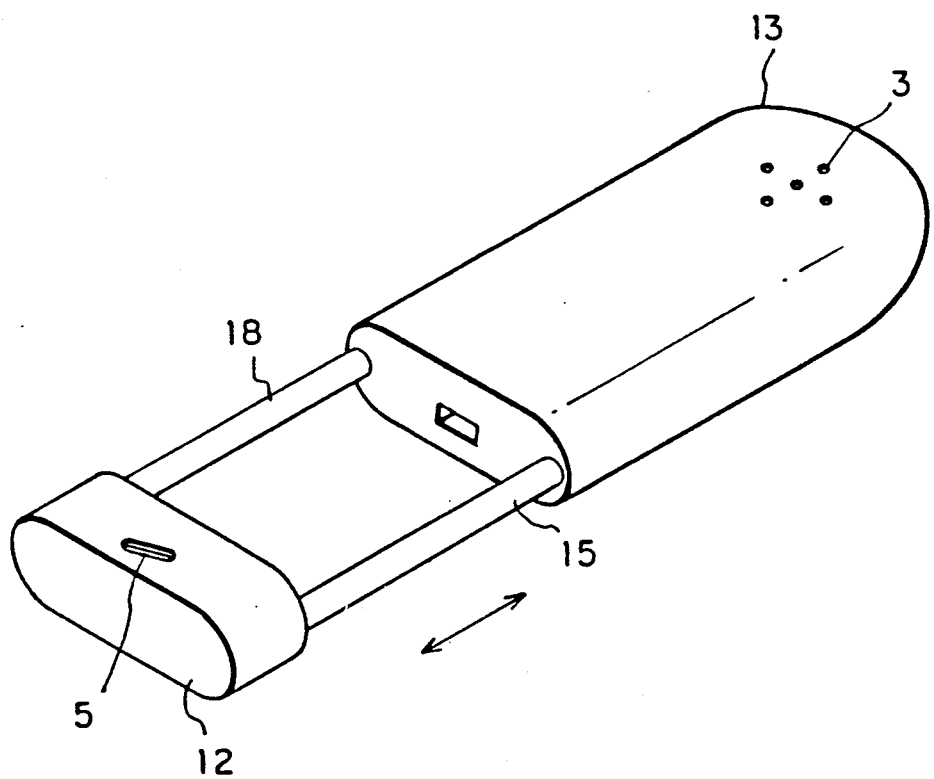
FIG. 17 is a perspective view showing another embodiment of a portable communication device according to this invention.

FIG. 17 is a perspective view showing a further embodiment of this invention, in which the structure of the radio telephone device body 12 and the receiver unit 13, as shown in the previous embodiment, is reversed so that only the microphone 4 is provided on the radio telephone device body 12, and other components such as the printed circuit board 35 are provided on the receiver unit 13. The specific structure of this embodiment, is the same as that of the previous embodiment.

Figure 18:
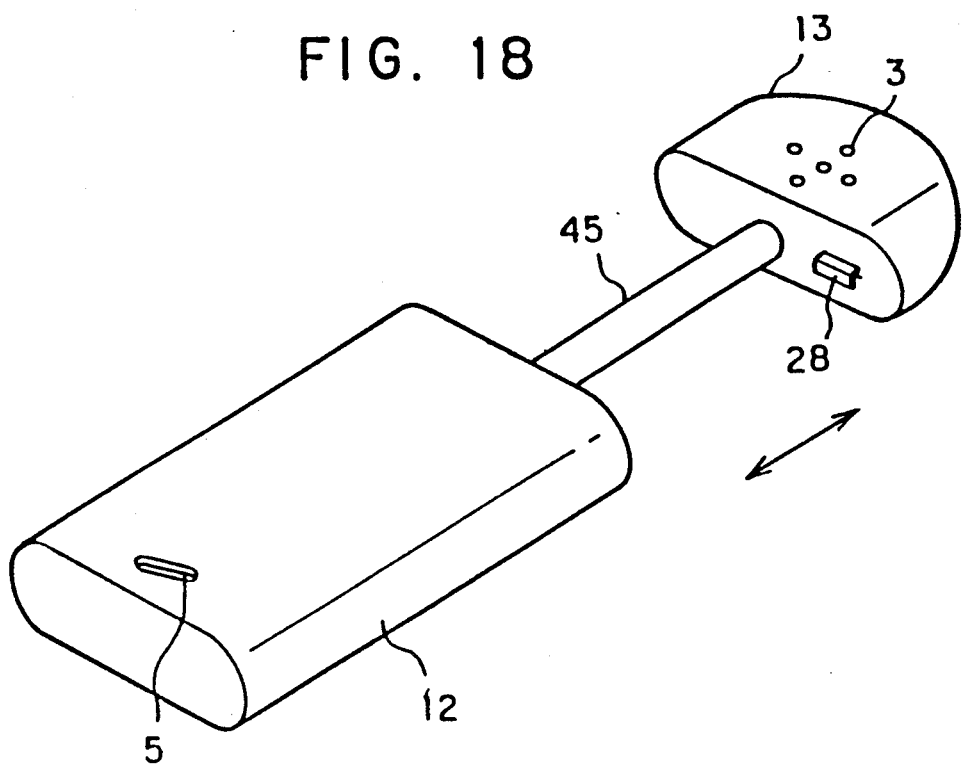
FIG. 18 is a perspective view showing the single support rod embodiment of the portable communication device.
Figure 20:
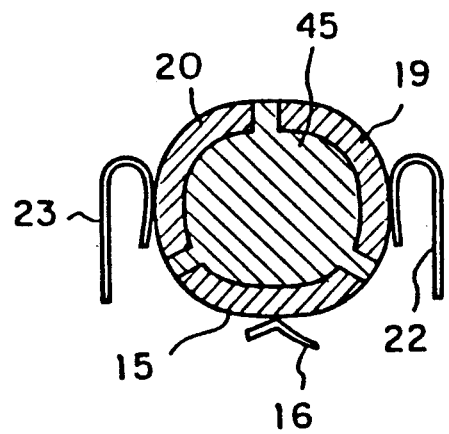
FIG. 20 is a cross-sectional view of support rod 45.

FIG. 18 is a perspective view showing a further embodiment of the invention, in which the radio telephone device body 12 and receiver unit 13 are held by a single support rod 45. The means for adjusting the distance between radio telephone device body 12 and the receiver unit 13 is substantially the same as that of the previous embodiments wherein support rod is recessable into the radio telephone device body 12. FIG. 20 is a cross-sectional view of support rod 45 showing metal body 15 which serves as the antenna and metal conductors 19 and 20. Support rod 45 is an injection molded center post which also serves as an electrical insulator. Metal springs 22 and 23 are mounted on the radio telephone device body 12 and contact metal conductors 19 and 20. Spring 16 contacts the antenna 15 and has one end soldered to the printed circuit board 35 as described with reference to the previous embodiment. Metal conductors 19 and 20 are connected t receiver 2 by signal wires 31 as shown with reference to FIG. 9. Metal springs 22 and 23 are electrically connected to the printed circuit board 35 by signal wires as shown with reference to FIG. 11.

As described above, according to this invention, the receiver unit is separated from the radio telephone device body and both the elements are supported on the supporting rods 15 and 18 so that they may be moved to and from each other, and therefor, the distance between the receiver and the microphone can be varied according to the mode being used. As a result, the device can be more conveniently used. The position of the receiver and microphone is not limited, and the shape of the radio telephone device can be miniaturized.

What is claimed is:

1. A portable communication device, comprising:
    a. a radio telephone device body enclosing therein a radio instrument means for transmitting information signals;
    b. a receiver unit formed independently of said radio telephone device body and enclosing therein a telephone receiver;
    c. support means comprising at least one supporting rod for holding said radio telephone device body and said receiver unit in an adjustable spaced-apart relationship; and
    d. means for adjusting the distance between said radio telephone device body and said receiver unit such that said device is usable as a pager when said receiver unit is adjacent said radio telephone device body and as a portable telephone when said receiver unit is spaced apart from said radio telephone device body.

2. The portable communication device according to claim 1, wherein said support means includes a plurality of supporting rods.

3. The portable communication device according to claim 2 wherein at least one of said plurality of supporting rods is a metal rod to be used as an antenna.

4. The portable communication device according to claim 2 wherein housing spaces are provided for said plurality of supporting rods and wherein an air hole is provided in said housing spaces.

5. The portable communication device according to claim 4, wherein said plurality of supporting rods includes a first metal rod to be used as an antenna, and a second rod having a pair of metal conductors insulatively disposed along a parallel axis thereof, a first metal spring having one end electrically connected to a printed circuit board provided in said radio telephone device body and placed in contact with said first metal rod, said telephone receiver is connected through a signal wire to one end of said metal conductors, a second metal spring provided in said radio telephone device body is placed in contact with the other end of said second rod, and said printed circuit board is connected to said second metal spring through a signal wire.

6. The portable communication device according to claim 5, wherein the supporting rod for providing said pair of metal conductors comprises an insulator.

7. The portable communication device according to claim 5, wherein a telephone unit and a pager unit are provided on the surface of said printed circuit board, and a control unit is provided on the back thereof.

8. The portable communication device according to claim 5, wherein said radio telephone device body is mounted on the supporting rods, and said supporting rods are encased in the receiver unit.

9. The portable communication device according to claim 8, wherein a microphone is provided on said radio telephone device body, and a printed circuit board on which are mounted a telephone unit, a pager unit and a control unit is provided on said receiver unit.

10. The portable communication device according to claim 1, wherein said device further comprises springs for exerting an outward force on at said least one support rod.

11. The portable communication device according to claim 1, wherein a corresponding engaging lever and hook are provided on the opposed surfaces between said radio telephone device body and said receiver unit.

12. The portable communication device according to claim 11 wherein said device further comprises a coil spring for forcing said engaging lever in an engaging direction.

13. The portable communication device according to claim 11, wherein said device further comprises a microswitch which is opened and closed by movement of said engaging lever to electrically switch said device to a telephone unit and a pager unit.

14. The portable communication device according to claim 1, wherein said receiver unit is mounted on the supporting rod, and said supporting rod encased in said radio telephone device body.

15. The portable communication device according to claim 14, wherein said supporting rod is provided with a plurality of recesses so that said radio telephone device body is securable at a plurality of distances from said receiver unit.

16. The portable communication device according to claim 1, wherein said supporting rod is provided with a recess engaged by an engaging pawl provided on the radio telephone device body when said receiver unit is moved away from said radio telephone device body.

17. The portable communication device according to claim 16, wherein said device further comprises a spring for forcing said engaging pawl in an engaging direction.

18. A portable communication device, comprising:
    a radio telephone device body enclosing therein a microphone for transducing sound into electrical signals;
    a receiver unit formed independently of said radio telephone device body and enclosing therein a telephone receiver and a radio instrument means for transmitting information signals including said electrical signals;
    support means comprising at least one supporting rod for holding said radio telephone device body and said receiver unit in an adjustable spaced-apart relationship; and
    means for adjusting the distance between said radio telephone device body and said receiver unit such that said device is usable as a pager when said receiver unit is adjacent said radio telephone device body and as a portable telephone when said receiver unit is spaced apart from said radio telephone device body.

* * * * *

UNITED STATES PATENT AND TRADEMARK OFFICE
CERTIFICATE OF CORRECTION

PATENT NO. : 5,109,539

DATED : April 28, 1992

INVENTOR(S) : Toshiya Inubushi et al.

It is certified that error appears in the above-identified patent and that said Letters Patent is hereby corrected as shown below:

On the title page, item [56] References Cited, "4,877,818" should be --4,847,818--.

Column 1, line 15, "t" should be --to--.

Column 4, line 36, after "41" the period "." should be a comma --,--.

Column 5, line 13, "t" should be --to--.

Signed and Sealed this

Twenty-first Day of September, 1993

Attest:

BRUCE LEHMAN

*Attesting Officer*   *Commissioner of Patents and Trademarks*